United States Patent
Wu

(10) Patent No.: US 8,253,550 B2
(45) Date of Patent: Aug. 28, 2012

(54) ROAD TRAFFIC MIRROR WITH ACTIVE INDICATING MODULE

(75) Inventor: Chia-Ying Wu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 517 days.

(21) Appl. No.: 12/612,048

(22) Filed: Nov. 4, 2009

(65) Prior Publication Data
US 2010/0271190 A1 Oct. 28, 2010

(30) Foreign Application Priority Data
Apr. 24, 2009 (CN) .......................... 2009 1 0301807

(51) Int. Cl.
*B60Q 1/00* (2006.01)
(52) U.S. Cl. ........... 340/438; 340/907; 340/905; 40/369
(58) Field of Classification Search .................. 340/438, 340/907, 905, 917, 933; 116/63 R, 63 P; 40/368, 369, 219
See application file for complete search history.

(56) References Cited

U.S. PATENT DOCUMENTS 6,688,028 B2 * 2/2004 Backe ............................. 40/612
2011/0267203 A1 * 11/2011 Lee et al. ....................... 340/928
* cited by examiner

*Primary Examiner* — Toan N Pham
(74) *Attorney, Agent, or Firm* — Altis Law Group, Inc.

(57) ABSTRACT

An exemplary road traffic mirror includes a casing, a mirror, a monitor, a processor, and an indicating module. The mirror and the hollow casing define a chamber therein, and the mirror includes a transparent glass and a reflection film formed on the transparent glass, wherein the reflection film is a narrow band pass film. The monitor is configured to automatically monitor road conditions and generate corresponding road condition signals. The processor is configured to analyze the road condition signals, and to generate switching signals. The indicating module is received in the chamber and facing the mirror, wherein the indicating module is configured to be activated by the switching signal and emit corresponding light rays, the light rays of the indicating module passing through the reflection film and forming an indication sign on the outside of the road traffic mirror.

12 Claims, 3 Drawing Sheets

ROAD TRAFFIC MIRROR WITH ACTIVE INDICATING MODULE

BACKGROUND

1. Technical Field

The present disclosure relates to road traffic mirrors and, particularly, to a road traffic mirror with an active indicating module.

2. Description of Related Art

Road traffic mirrors are widely used on the road for helping drivers to observe road conditions and safely handle hazards such as blind spots. Current road traffic mirrors are usually convex reflection mirrors. Blind spots exist at many road bends, and drivers need to take extra caution to observe the road conditions with the aid of the road traffic mirrors. However, when the visibility is bad (e.g. fog, snow, rain, etc), drivers may not be able to see the road and the road traffic mirrors clearly.

Therefore, there is room for improvement in safety on the road.

DETAILED DESCRIPTION

Embodiments of a road traffic mirror will now be described in detail with reference to the drawings.

Figure 1:
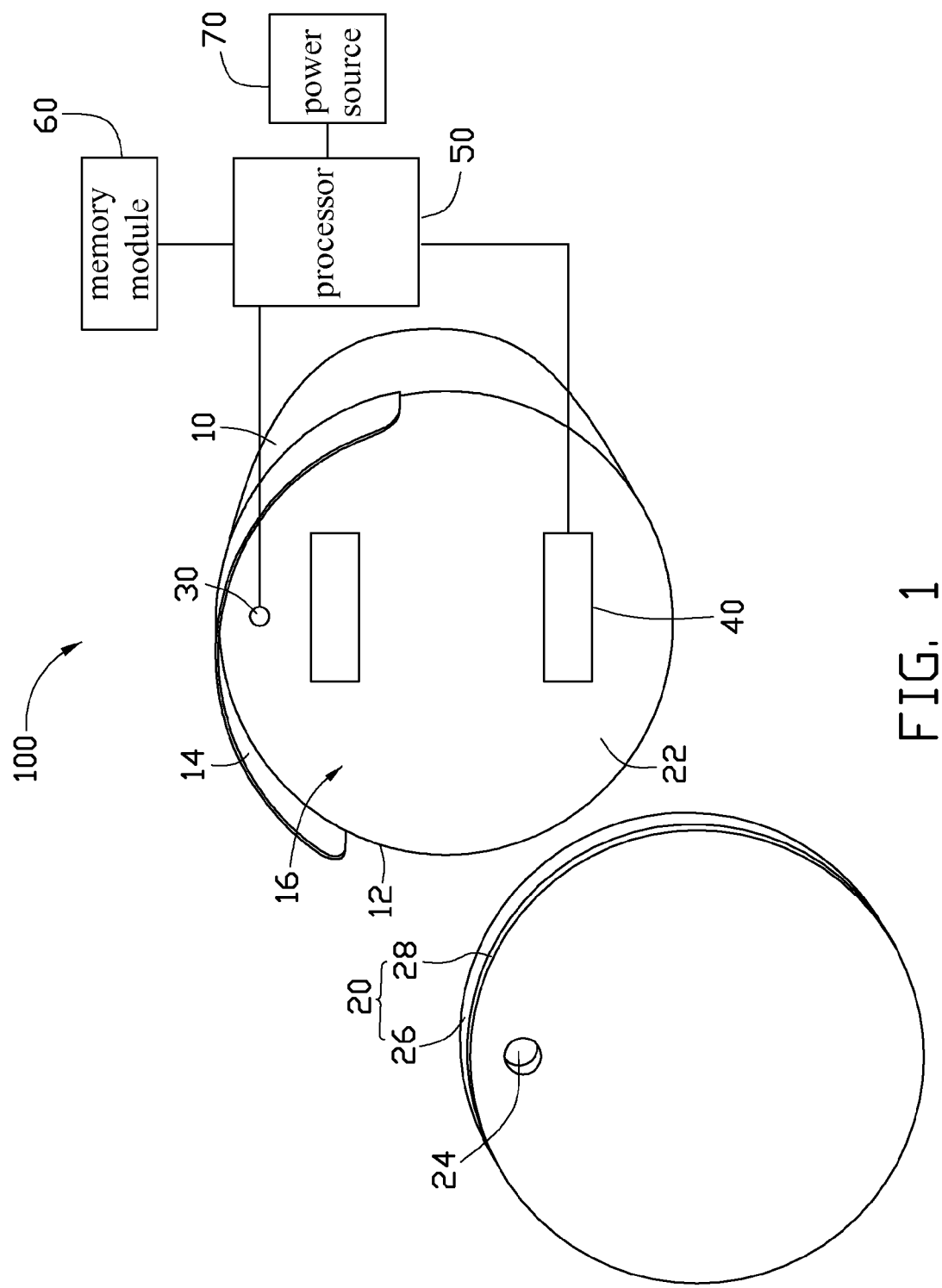
FIG. 1 is a schematic, exploded view of a road traffic mirror, according to an exemplary embodiment of the present disclosure.
Figure 2:
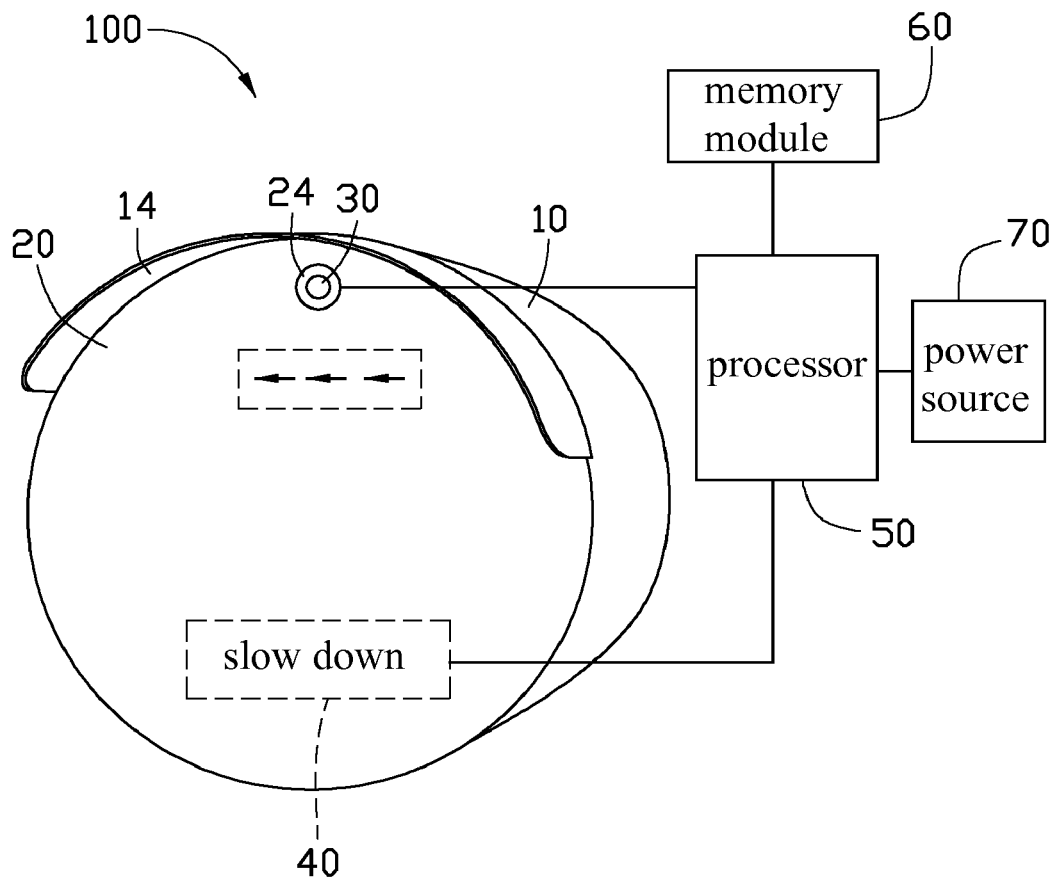
FIG. 2 is an assembled view of the road traffic mirror of FIG. 1, showing operation of the road traffic mirror.

Referring to FIGS. 1-2, a road traffic mirror 100, according to an exemplary embodiment, includes a casing 10, a mirror 20, a monitor 30, an indicating module 40, a processor 50, a memory module 60, and a power source 70.

The casing 10 is a hemispherical, spherical or dome-shaped shell in shape, and has an opening 12 defined at one side thereof. In practice, the casing 10 also includes an arc-shaped shielding plate 14, which extends from a portion of the edge of the casing 10 around the opening 12. The shielding plate 14 is configured to shield the mirror 20, the reflection film 30, and the monitor 40 from dust and rain. The casing 10 includes an inner surface 16.

The mirror 20 is circular in shape. The diameter of the mirror 20 is slightly smaller than that of the opening 12 of the casing 10. As such, the mirror 20 can fittingly seal the opening 12, such that the casing 10 and the mirror 20 cooperatively define a chamber 22. The mirror 20 has a receiving hole 24 defined therein. The receiving hole 24 is positioned immediately beneath the shielding plate 14. The mirror 20 includes a transparent glass 26, and a reflection film 28 formed on an outer side of the transparent glass 26. Typically, the transparent glass 26 is a convex glass plate, with the convex surface protruding away from the inner surface 16. In other embodiments, the transparent glass 26 may instead be another suitable transparent material.

The reflection film 28 is a narrow band pass film. That is, only a narrow range of light rays wavelengths can pass through the reflection film 28. Other light rays are reflected by the reflection film 28. In this embodiment, light rays with wavelengths in the range of from approximately 560 nanometers (nm) to approximately 620 nm can pass through the reflection film 28. The reflection film 28 includes a plurality of layers, which are designated as a first layer through to a twenty-fourth layer in sequence from the surface of the transparent glass 26. The odd-numbered layers in the sequence are high refractive index material layers, and the even-numbered layers in the sequence are low refractive index material layers. The refractive index of the high refractive index material layers is in a range from about 2.3 to about 2.5. In this embodiment, the high refractive index material layers are made from material selected from the group consisting of titanium pentoxide ($Ti_3O_5$) and titanium dioxide ($TiO_2$). The refractive index of the low refractive index material layers is in a range from about 1.38 to about 1.46. In this embodiment, the low refractive index material layers are made from material selected from the group consisting of silicon dioxide ($SiO_2$) and aluminum trioxide ($Al_2O_3$). In the present embodiment, the reflection film 28 is formed on a surface of the mirror 20 farthest away from the inner surface 16.

Table 1 shows data of the reflection film 28 of this embodiment.

TABLE 1

| Film | Material | Refractive Index | Thickness (nm) |
|---|---|---|---|
| First layer | $Ti_3O_5$ | 2.4379 | 0.911 |
| Second layer | $SiO_2$ | 1.4495 | 1.003 |
| Third layer | $Ti_3O_5$ | 2.4379 | 0.863 |
| Fourth layer | $SiO2$ | 1.4495 | 0.910 |
| Fifth layer | $Ti_3O_5$ | 2.4379 | 0.867 |
| Sixth layer | $SiO_2$ | 1.4495 | 0.911 |
| Seventh layer | $Ti_3O_5$ | 2.4379 | 0.895 |
| Eighth layer | $SiO_2$ | 1.4495 | 0.901 |
| Ninth layer | $Ti_3O_5$ | 2.4379 | 0.894 |
| Tenth layer | $SiO_2$ | 1.4495 | 0.842 |
| Eleventh layer | $Ti_3O_5$ | 2.4379 | 1.054 |
| Twelfth layer | $SiO_2$ | 1.4495 | 1.411 |
| Thirteenth film | $Ti_3O_5$ | 2.4379 | 1.278 |
| Fourteenth layer | $SiO_2$ | 1.4495 | 1.260 |
| Fifteenth layer | $Ti_3O_5$ | 2.4379 | 1.591 |
| Sixteenth layer | $SiO_2$ | 1.4495 | 1.481 |
| Seventeenth layer | $Ti_3O_5$ | 2.4379 | 1.508 |
| Eighteenth layer | $SiO_2$ | 1.4495 | 1.405 |
| Nineteenth layer | $Ti_3O_5$ | 2.4379 | 1.375 |
| Twentieth layer | $SiO_2$ | 1.4495 | 1.290 |
| Twenty-first layer | $Ti_3O_5$ | 2.4379 | 1.296 |
| Twenty-second layer | $SiO_2$ | 1.4495 | 1.771 |
| Twenty-third layer | $Ti_3O_5$ | 2.4379 | 1.469 |
| Twenty-fourth layer | $SiO_2$ | 1.4495 | 0.891 |

The monitor 30 is received in the receiving hole 24 of the mirror 20. The monitor 30 is configured to monitor the road conditions when the road traffic mirror 100 is installed by the roadside, and to generate corresponding road condition signals. In the present embodiment, the monitor 40 includes a camera. In the other embodiments, the monitor 30 can be other image sensor for detecting the road conditions.

The indicating module 40 is received in the chamber 22, and faces the mirror 20. The indicating module 40 includes an array of light emitting diodes (LEDs), and the light rays emitted from the LEDs with wavelengths in the range of from approximately 560 nm to approximately 620 nm. The indicating module 40 can display any of a variety of indication signs or messages when some of the LEDs are lit and some of the LEDs are unlit. In this embodiment, the indication sign is "slow down."

The processor 50 is received in the chamber 22, and is electrically connected to the monitor 30 and the indicating module 40. The processor 40 is configured to analyze the road conditions according to the road condition signals sent from the monitor 30, and to generate switching signals to control the indicating module 50 accordingly.

The memory module 60 is received in the chamber 22, and is electrically connected to the processor 50. The memory module 60 is configured to store the road condition signals generated by the monitor 30.

The power source 70 is a solar cell. The power source 70 is electrically connected to the processor 50, and provides electrical energy to the monitor 30, the indicating module 40, the processor 50, and the memory module 60.

Figure 3:
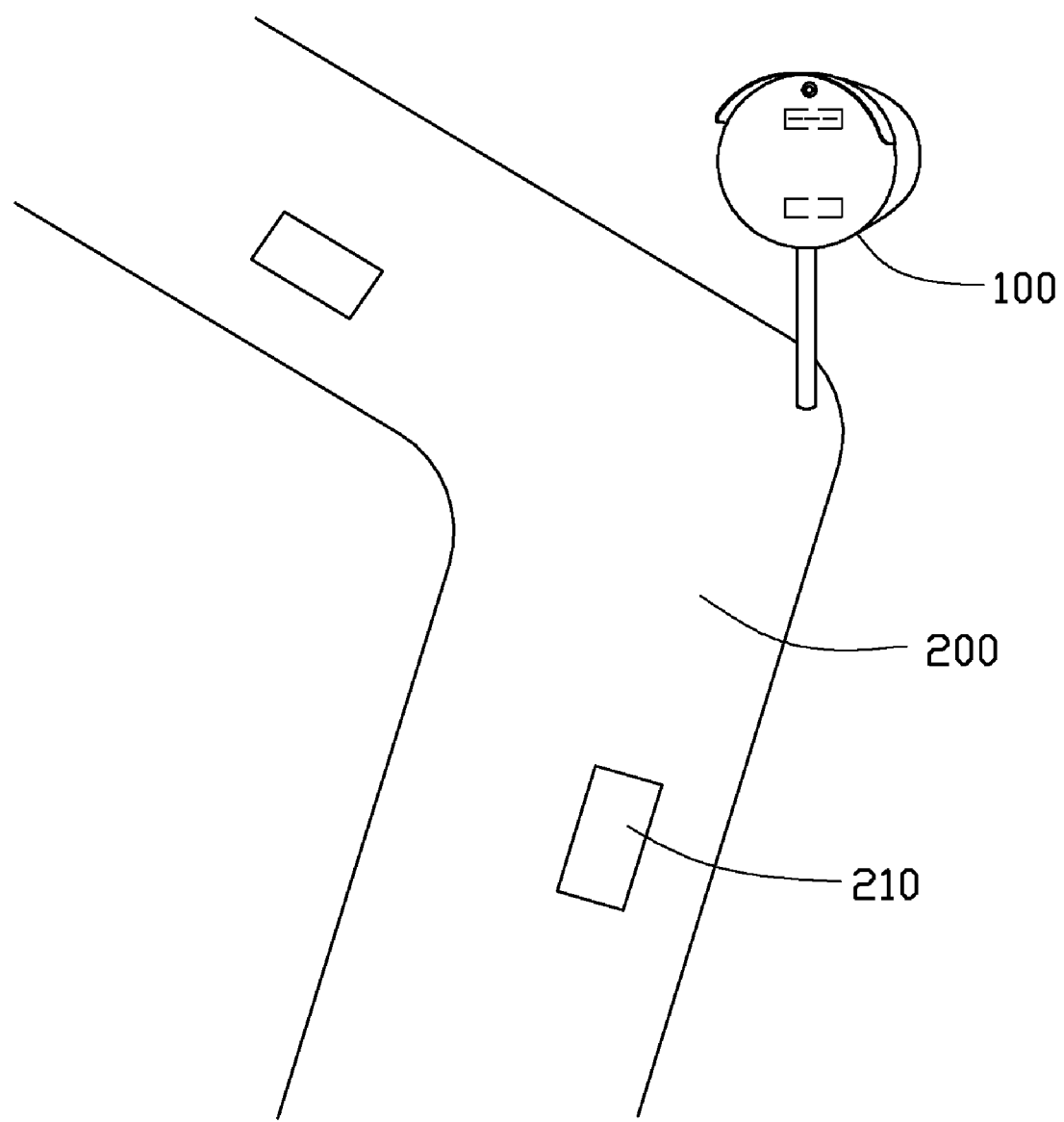
FIG. 3 is a diagram showing the road traffic mirror of FIG. 2, in use at a road bend.

Referring also to FIG. 3, a driver of a vehicle observes road conditions at a road bend 200 by, among other things, viewing the mirror 20 of the road traffic mirror 100. At the same time, the monitor 30 monitors the road conditions of the road bend 200, and sends road condition signals to the processor 50. The processor 50 analyzes the road condition signals. If any moving object 210 (such as a vehicle or a pedestrian) at or in the vicinity of the road bend 200 is detected by the monitor 30, the processor 50 generates a switching signal to activate the indicating module 40. The light rays of the indicating module 40 pass through the mirror 20. The road traffic mirror 100 allows the driver to clearly see the indication sign(s) of the indicating module 50. The driver is thus able to control the speed of the vehicle or take other precautionary action according to the indication sign(s). If nothing is detected at or in the vicinity of the road bend 200, the processor 50 generates a switching signal to deactivate the indicating module 40.

It will be understood that the above particular embodiments and methods are shown and described by way of illustration only. The principles and the features of the present embodiments may be employed in various and numerous other embodiments without departing from the scope of the invention as claimed. The above-described embodiments illustrate the scope of the invention but do not restrict the scope of the invention.

What is claimed is:

1. A road traffic mirror comprising:
   a hollow casing;
   a mirror and the casing defining a chamber therein, the mirror comprising a transparent glass and a reflection film formed on the transparent glass, wherein the reflection film is a narrow band pass film;
   a monitor configured to automatically monitor road conditions and generate corresponding road condition signals;
   a processor configured to analyze the road condition signals, and to generate switching signals; and
   an indicating module received in the chamber and facing the mirror, wherein the indicating module is configured to be activated by one of the switching signals and thereby emit light rays, the light rays of the indicating module passing through the reflection film and forming an indication sign on the outside of the road traffic mirror.

2. The road traffic mirror in claim 1, wherein the narrow band pass film passes light rays with wavelengths in the range of from approximately 560 nm to approximately 620 nm, and reflects all other light rays; the light rays emitted from the indicating module with wavelengths in the range of from approximately 560 nm to approximately 620 nm.

3. The road traffic mirror in claim 1, wherein the reflection film comprises a first layer through to a twenty-fourth layer, the odd-numbered layers are high refractive index material layers, and the even-numbered layers are low refractive index material layers.

4. The road traffic mirror in claim 3, wherein the refractive index of the high refractive index material layers is in a range from about 2.3 to about 2.5, and the refractive index of the low refractive index material layers is in a range from about 1.38 to about 1.46.

5. The road traffic mirror in claim 1, wherein the mirror defines a receiving hole, and the monitor is received in the receiving hole.

6. The road traffic mirror in claim 1, further comprising a memory module, wherein the memory module is configured to store information on the road conditions monitored by the monitor.

7. The road traffic mirror in claim 6, wherein the indicating module, the processor, and the memory module are received in the chamber.

8. The road traffic mirror in claim 6, further comprising a power source, wherein the power source is electrically connected to the processor and is able to provide electrical energy to the monitor, the indicating module, the processor, and the memory module.

9. The road traffic mirror in claim 8, wherein the power source is a solar cell.

10. The road traffic mirror in claim 1, wherein the indicating module comprises an array of light emitting diodes (LEDs), and can form any of a plurality of different indication signs on the outside of the road traffic mirror by lighting some of the LEDs and leaving other of the LEDs unlit.

11. The road traffic mirror in claim 1, wherein the reflection film formed on an outer side of the transparent glass.

12. A road traffic mirror comprising:
    a hollow casing;
    a mirror at a front end of the casing, and the mirror comprising a transparent glass and a reflection film formed on the transparent glass, wherein the reflection film comprises a narrow band pass film;
    an image sensor structured and arranged to automatically monitor road conditions and generate corresponding road condition signals;
    a processor configured to analyze the road condition signals, and selectively generate switching signals according to the analysis; and
    an indicating module received in the casing and facing the mirror, wherein the indicating module is configured to be activated and deactivated by corresponding of the switching signals, the indicating module when activated emitting light rays that pass through the reflection film and form an indication sign on the outside of the mirror.

* * * * *